US011997090B2

(12) United States Patent
Stocker et al.

(10) Patent No.: US 11,997,090 B2
(45) Date of Patent: May 28, 2024

(54) SYSTEMS AND METHODS FOR WebAuthn TRANSPORT VIA A WebAuthn PROXY

(71) Applicant: Cisco Technology, Inc., San Jose, CA (US)

(72) Inventors: Oliver Robert Stocker, Ann Arbor, MI (US); Jeremy Lee Erickson, Renton, WA (US); David Steven Gross, Cincinnati, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 360 days.

(21) Appl. No.: 17/456,690

(22) Filed: Nov. 29, 2021

(65) Prior Publication Data

US 2023/0171252 A1 Jun. 1, 2023

(51) Int. Cl.
*H04L 9/40* (2022.01)
(52) U.S. Cl.
CPC .............................. *H04L 63/0884* (2013.01)
(58) Field of Classification Search
CPC ..................... H04L 63/0884; H04L 63/08
See application file for complete search history.

(56) References Cited

U.S. PATENT DOCUMENTS

| 9,729,539 B1* | 8/2017 | Agrawal ............. H04L 63/0815 |
| 2019/0207928 A1* | 7/2019 | Bhargava ............ H04L 63/0815 |
| 2020/0374284 A1 | 11/2020 | Suresh et al. |
| 2020/0403993 A1 | 12/2020 | Alexander et al. |

FOREIGN PATENT DOCUMENTS

WO 2020144518 A1 7/2020

OTHER PUBLICATIONS

Paul Wagner, et al., Remote WebAuthn: FIDO2 Authentication for Less Accessible Devices, pp. 368-375, Copyright ©2021 by SCITEPRESS, Science and Technology Publications, Ltd.
Alan Schmitz, MFAProxy: A reverse proxy for multi-factor authentication, Iowa State University Capstones, Theses and Dissertations, Fall 2019, https://lib.dr.iastate.edu/creativecomponents.

* cited by examiner

*Primary Examiner* — Huan V Doan
(74) *Attorney, Agent, or Firm* — Baker Botts L.L.P.

(57) ABSTRACT

In one embodiment, a method includes receiving, by a WebAuthn proxy, login prompt information from a browser. The WebAuthn proxy and the browser are installed on a device. The method also includes generating, by the WebAuthn proxy, a WebAuthn credential request based on the login prompt information and communicating, by the WebAuthn proxy, the WebAuthn credential request to a WebAuthn authenticator. The method further includes receiving, by the WebAuthn proxy, a WebAuthn response from the WebAuthn authenticator and communicating, by the WebAuthn proxy, the WebAuthn response to the browser.

17 Claims, 4 Drawing Sheets

SYSTEMS AND METHODS FOR WebAuthn TRANSPORT VIA A WebAuthn PROXY

TECHNICAL FIELD

The present disclosure relates generally to communication networks, and more specifically to systems and methods for Web Authentication (WebAuthn) transport via a WebAuthn proxy.

BACKGROUND

WebAuthn is an application programming interface (API) that allows servers to register and authenticate users using public key cryptography rather than a password. A private-public keypair (known as a credential) is created for a website. The private key is stored on the user's device, and the public key and randomly generated credential ID are stored on the server. The server can then use that public key to prove the user's identity. However, the WebAuthn protocol only supports certain browsers (e.g., Google Chrome, Mozilla Firefox, Microsoft Edge, and Apple Safari) and authenticator transports (e.g., Universal Serial Bus (USB), Bluetooth Low Energy (BLE), and Near Field Communications (NFC)).

DESCRIPTION OF EXAMPLE EMBODIMENTS

Overview

According to an embodiment, a device includes one or more processors and one or more computer-readable non-transitory storage media coupled to the one or more processors and including instructions that, when executed by the one or more processors, cause the device to perform operations. The operations include receiving, by a WebAuthn proxy, login prompt information from a browser. The WebAuthn proxy and the browser are installed on the device. The operations also include generating, by the WebAuthn proxy, a WebAuthn credential request based on the login prompt information and communicating, by the WebAuthn proxy, the WebAuthn credential request to a WebAuthn authenticator. The operations further include receiving, by the WebAuthn proxy, a WebAuthn response from the WebAuthn authenticator and communicating, by the WebAuthn proxy, the WebAuthn response to the browser.

According to another embodiment, a method includes receiving, by a WebAuthn proxy, login prompt information from a browser. The WebAuthn proxy and the browser are installed on a device. The method also includes generating, by the WebAuthn proxy, a WebAuthn credential request based on the login prompt information and communicating, by the WebAuthn proxy, the WebAuthn credential request to a WebAuthn authenticator. The method further includes receiving, by the WebAuthn proxy, a WebAuthn response from the WebAuthn authenticator and communicating, by the WebAuthn proxy, the WebAuthn response to the browser.

According to yet another embodiment, one or more computer-readable non-transitory storage media embody instructions that, when executed by a processor, cause the processor to perform operations. The operations include receiving, by a WebAuthn proxy, login prompt information from a browser. The WebAuthn proxy and the browser are installed on a device. The operations also include generating, by the WebAuthn proxy, a WebAuthn credential request based on the login prompt information and communicating, by the WebAuthn proxy, the WebAuthn credential request to a WebAuthn authenticator. The operations further include receiving, by the WebAuthn proxy, a WebAuthn response from the WebAuthn authenticator and communicating, by the WebAuthn proxy, the WebAuthn response to the browser.

In certain embodiments, the device is a local device. The WebAuthn authenticator may be installed on the local device, and the browser may be an embedded browser in a local application installed on the local device.

In some embodiments, the device is a remote device. The WebAuthn authenticator may be installed on a local device. The WebAuthn proxy may be a remote WebAuthn proxy installed on the remote device that communicates the WebAuthn credential request to the WebAuthn authenticator via a local WebAuthn proxy installed on the local device. The remote WebAuthn proxy may receive the WebAuthn response from the WebAuthn authenticator via the local WebAuthn proxy.

In certain embodiments, the login prompt information includes a challenge and a Relying Party (RP) identifier (RPID). In some embodiments, the WebAuthn response includes an authenticator assertion. In certain embodiments, the WebAuthn authenticator is associated with one of the following: a security key or a platform authenticator. In some embodiments, the browser does not support WebAuthn. In certain embodiments, the WebAuthn proxy is associated with a device health application.

Technical advantages of certain embodiments of this disclosure may include one or more of the following. The systems and methods described herein may use a WebAuthn proxy on the user's endpoint to overcome the limitations of the WebAuthn protocol while preserving the core security properties of the protocol. In certain embodiments, the WebAuthn proxy communicates with a WebAuthn authenticator on behalf of a browser that does not support WebAuthn. In some embodiments, the WebAuthn proxy forwards the WebAuthn request from a remote computer to a local computer, which allows the user to log into a WebAuthn application (e.g. a web browser) on the remote computer.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for WebAuthn transport via a WebAuthn proxy. WebAuthn, which is a core component of Fast Identity Online (FIDO) Alliance's FIDO2 set of specifications, is a web-based API that allows websites to update their login pages to add FIDO-based authentication on supported browsers and platforms. Since the WebAuthn protocol only supports certain browsers (e.g., Chrome, Mozilla Firefox, Microsoft Edge, and Apple Safari) and authenticator transports (e.g., USB, BLE, and NFC), users with a valid WebAuthn authenticator may be prevented from logging into browsers (e.g., embedded browsers and legacy browsers) that do not support the WebAuthn protocol. Users with a valid WebAuthn authenticator may also be prevented from logging into applications on remote computers. The embedded browser and remote computer authentication issues are challenging problems to solve because WebAuthn depends on origin binding and channel binding to provide its security properties, which may prevent phishing. A current workaround for these limitations is to install a browser extension. The browser extension intercepts the WebAuthn API request in the browser and proxies the request to the user's authenticator. However, this approach only addresses the problems caused by limited transports since embedded browsers do not widely support third-party extensions.

Certain embodiments of this disclosure allow a user with a valid WebAuthn authenticator to log into an embedded browser and/or remote computer via a WebAuthn proxy. In the embedded browser use case, the WebAuthn proxy may communicate with the WebAuthn authenticator on behalf of the embedded browser so that the embedded browser is not required to support WebAuthn. In the remote computer use case, the WebAuthn proxy may proxy a WebAuthn request to a local computer so that the user can log into a WebAuthn application on the remote computer.

Figure 1:
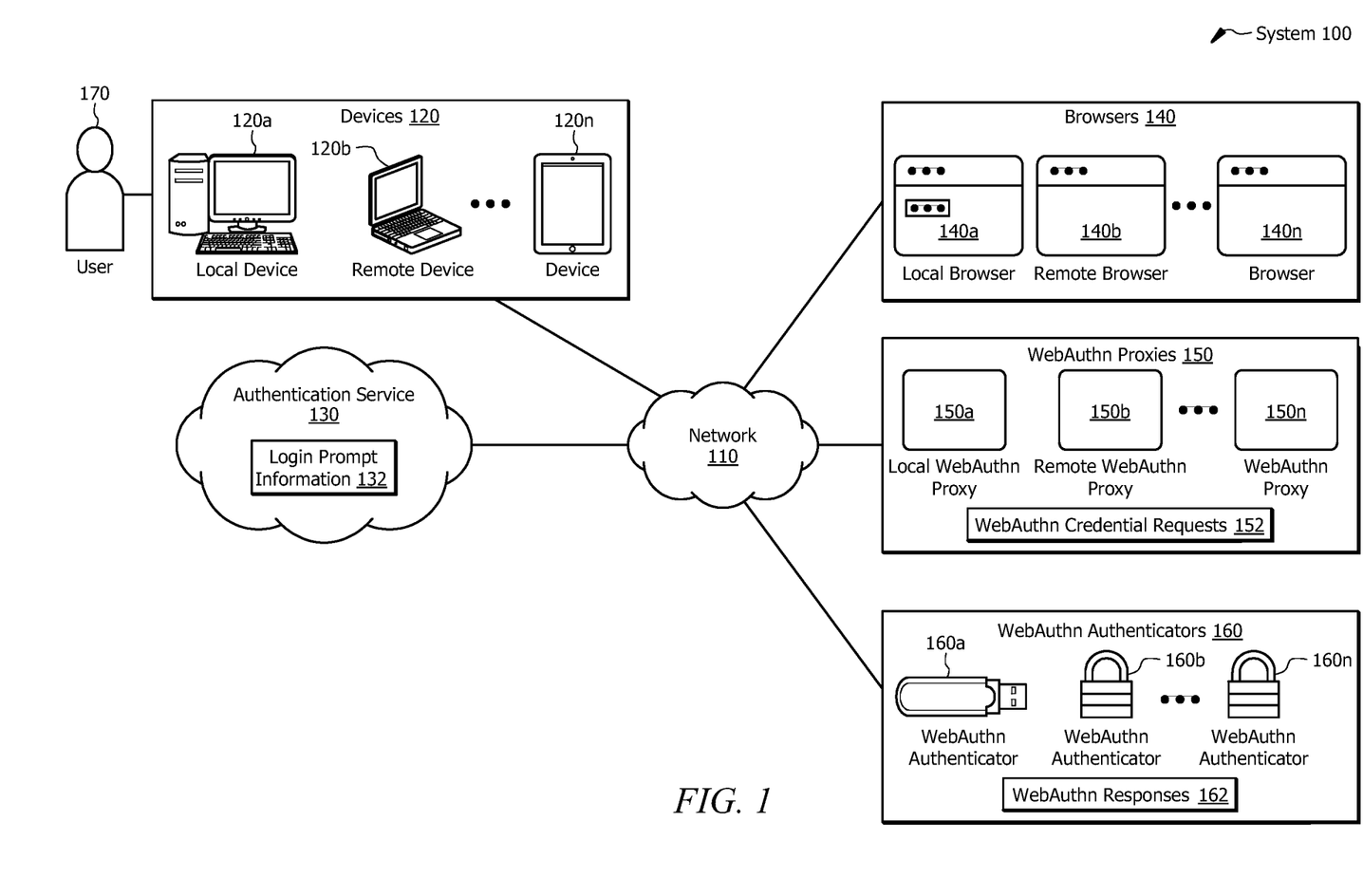
FIG. 1 illustrates an example system for WebAuthn transport via a WebAuthn proxy.

FIG. 1 illustrates an example system 100 for WebAuthn transport via a WebAuthn proxy. System 100 or portions thereof may be associated with an entity, which may include any entity, such as a business, company, or enterprise, that uses WebAuthn transport via a WebAuthn proxy. In certain embodiments, the entity may be a service provider that provides authentication and/or security services. The components of system 100 may include any suitable combination of hardware, firmware, and software. For example, the components of system 100 may use one or more elements of the computer system of FIG. 4. In the illustrated embodiment of FIG. 1, system 100 includes a network 110, devices 120, an authentication service 130, browsers 140, WebAuthn proxies 150, WebAuthn authenticators 160, and a user 170.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 110 may include one or more devices 120.

Devices 120 of system 100 include any user equipment that can receive, create, process, store, and/or communicate information. Devices 120 may include one or more workstations, desktop computers, laptop computers, mobile phones (e.g., smartphones), tablets, personal digital assistants (PDAs), wearable devices, and the like. In certain embodiments, one or more devices 120 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. Devices 120 may be located in any suitable locations to receive and communicate information to user 170 of system 100.

In the illustrated embodiment of FIG. 1, devices 120 include device 120a through device 120n, where n represents any suitable integer. Devices 120 include local device 120a and remote device 120b. Local device 120a is a physical device that is not attached at some other point on network 110 as a remote device. In certain embodiments, local device 120a may be located on the premises of an employer of user 170. Remote device 120b is a device with remote access. In some embodiments, remote device 120b may be located at a residence of user 170. In certain embodiments, user 170 may access, via a connection established between local device 120a and remote device 120b, certain applications on local device 120a using remote device 120b. User 170 may use one or more devices 120 (e.g., local device 120a and remote device 120b) to communicate with authentication service 130.

Authentication service 130 of system 100 is any service that is used to verify an identity of user 170. In certain embodiments, authentication service 130 is delivered on demand to user 170 (e.g., a customer, a company, etc.). In some embodiments, authentication service 130 is delivered to user 170 via the Internet. Authentication service 130 may include Infrastructure-as-a-Service (IaaS), Platforms-as-a-Service (PaaS), Software-as-a-Service (SaaS), and the like. Authentication service 130 may provide on-demand availability of computer system resources (e.g., data storage and computing power) without direct active management by user 170. In certain embodiments, authentication service 130 is a security platform that provides authentication services (e.g., two-factor authentication (2FA)), endpoint security, remote access solutions, and the like. Authentication service 130 may integrate with enterprise cloud app providers (e.g., Microsoft Office 365, Google Apps, Box, Salesforce, etc.). In the illustrated embodiment of FIG. 1, authentication service 130 is a cloud service that provides authentication services to user 170 of device 120.

In certain embodiments, authentication service 130 generates login prompt information 132. Login prompt information 132 is any information that may be used to generate a WebAuthn request. Login prompt information 132 may include one or more of the following: a challenge, an RPID, a transaction identifier (TXID), allow credential(s), a timeout, a user verification, a combination thereof, or any other suitable information. In some embodiments, certain login prompt information 132 (e.g., the challenge) is required and certain login prompt information 132 (e.g., the RPID, the TXID, the allow credentials, the timeout, and the user verification) are optional.

In certain embodiments, the challenge is a nonce that is unique to each transaction. The challenge may include a random value generated by the RP for WebAuthn authenticator 160 to sign as part of the authentication assertion. In some embodiments, the RPID refers to the server that provides access to a secure software application. The RPID may be claimed by the caller and must exactly match the RPID specified during registration. In certain embodiments, the TXID is an identifier specific to authentication service 130 that is used to track requests to WebAuthn proxies 150. The TXID may be a token that is generated when an authentication verification (e.g., a 2FA verification) is requested.

In certain embodiments, the allow credentials include a list of public key credentials acceptable to an RP, a type of the credential, a credential ID, a list of transports the device can use to find the credential, and the like. In some embodiments, the timeout is the time that the caller is willing to wait for the call to complete. The timeout may be measured in milliseconds. In certain embodiments, the user verification may be "preferred," "required," or "discouraged." The default value is "preferred." "Required" indicates that the device will only use an authenticator capable of user verification. "Preferred" indicates that the device will use an authenticator capable of user verification if possible. "Discouraged" indicates that the authenticator is not asked to perform user verification but may do so at its discretion. In some embodiments, authentication service 130 communicates login prompt information 132 to one or more browsers 140.

Browsers 140 of system 100 are application software that may be used to access the World Wide Web. One or more browsers 140 may be used on one or more devices 120 of system 100. For example, one or more browsers 140 may retrieve content from a website's web server and display the content on one or more devices 120. In the illustrated embodiment of FIG. 1, browsers 140 include browser 140a through browser 140n, where n represents any suitable integer. Browsers 140 include a local browser 140a and a remote browser 140b. Local browser 140a is a browser installed on local device 120a. Remote browser 140b is a browser installed on remote device 120b.

One or more browsers 140 of system 100 may be embedded browsers. An embedded browser is a built-in web browser that allows access to Internet sites without leaving an application. An embedded web browser may enable navigation, document viewing, data download, and other browser functionality to a non-web application. User 170 may use an embedded browser to browse the Internet, local folders, network folders, and the like from within an application. In some embodiments, one or more browsers 140 (e.g., an embedded browser, a legacy browser, etc.) do not support WebAuthn protocols. For example, local browser 140a may be an embedded browser in a local application installed on local device 120a that does not support WebAuthn. In certain embodiments, one or more browsers 140 (e.g., Chrome, Firefox, the Edge, Safari, etc.) support WebAuthn protocols. For example, remote browser 140b installed on remote device 120b may or may not support WebAuthn. In some embodiments, remote browser 140b may use one or more WebAuthn proxies 150 to facilitate a remote authentication.

In certain embodiments, browsers 140 detect whether WebAuthn is available. If local browser 140a (e.g., Chrome, Firefox, the Edge, Safari, etc.) detects that WebAuthn is available, local browser 140a may use the WebAuth API in browser 140a to communicate with WebAuthn authenticator 160. If local browser 140a (e.g., an embedded browser, a legacy browser, etc.) detects that WebAuthn is unavailable, local browser 140a may use WebAuthn proxy 150 to facilitate authentication.

WebAuthn proxies 150 of system 100 are applications that act as intermediaries between browsers 140 and WebAuthn authenticators 160. In the illustrated embodiment of FIG. 1, WebAuthn proxies 150 include WebAuthn proxy 150a through WebAuthn proxy 150n, where n represents any suitable integer. WebAuthn proxies 150 include a local WebAuthn proxy 150a and a remote WebAuthn proxy 150b. Local WebAuthn proxy 150a is installed on local device 120a. Remote WebAuthn proxy 150b is installed on remote device 120b. In certain embodiments, WebAuthn proxies 150 receive and communicate information to one or more components of system 100. One or more WebAuthn proxies 150 may receive login prompt information 132 from one or more browsers 140. Using login prompt information 132, WebAuthn proxies 150 may generate WebAuthn credential requests 152.

WebAuthn credential requests 152 are used by WebAuthn proxies 150 to request WebAuthn responses 162 (e.g., authenticator assertions) from WebAuthn authenticators 160. WebAuthn credential requests 152 may include some or all of the information included in login prompt information 132. For example, WebAuthn credential requests 152 may include the challenge, the RPID, the TXID, the allow credential(s), the timeout, the user verification, a combination thereof, or any other suitable information. In certain embodiments, one or more WebAuthn credential requests 152 include a client data hash, which is a hash of the JavaScript Object Notation (JSON)-compatible serialization of the client data. WebAuthn proxies 150 may communicate WebAuthn credential requests 152 to WebAuthn authenticators 160.

WebAuthn authenticators 160 of system 100 are cryptographic entities that exists in hardware and/or software. WebAuthn authenticators 160 may register user 170 with a given RP and later assert possession of the registered public key credential. In certain embodiments, WebAuthn authenticators 160 verify user 170 when requested by the RP. WebAuthn authenticators 160 may be roaming authenticators, dedicated hardware subsystems integrated into devices 120, software components of devices 120, and the like. WebAuthn authenticators 160 may include one or more security keys (e.g., a USB, BLE, NFC, or Universal $2^{nd}$ Factor (U2F) security key) and/or platform authenticators (e.g., Windows Hello or Touch ID).

In the illustrated embodiment of FIG. 1, WebAuthn authenticators 160 include WebAuthn authenticator 160a through WebAuthn authenticator 160n, where n represents any suitable integer. WebAuthn authenticators 160 include a WebAuthn authenticator 160a and a WebAuthn authenticator 160b. WebAuthn authenticator 160a is a security key (e.g., a USB, BLE, NFC, or U2F security key). The security key may be installed and/or inserted into local device 120a and/or remote device 120b. WebAuthn authenticator 160b is a platform authenticator (e.g., Windows Hello or Touch ID).

WebAuthn authenticator 160*b* may be installed on local device 120*a* and/or remote device 120*b*.

WebAuthn authenticators 160 process WebAuthn credential requests 152 received from WebAuthn proxies 150. In certain embodiments, WebAuthn authenticators 160 interact with user 170 to process WebAuthn credential requests 152. After processing WebAuthn credential requests 152, WebAuthn authenticators 160 generate WebAuthn responses 162. WebAuthn responses 162 include the metadata required to validate an authenticator assertion. For example, WebAuthn responses 162 may include an authenticator assertion, a reply TXID, authenticator data, client data, a signature, a credential ID, a combination thereof, or any other suitable information. The authenticator data is a structure that encodes contextual bindings made by WebAuthn authenticators 160. The client data is an attribute that includes a JSON-compatible serialization of the client data. The signature includes the raw signature returned from WebAuthn authenticators 160. The credential ID is generated by WebAuthn authenticator 160. In certain embodiments, the credential ID is a probabilistically-unique byte sequence that identifies a public key credential source and its authentication assertions.

In certain embodiments, WebAuthn authenticators 160 communicate WebAuthn responses 162 to WebAuthn proxies 150. Upon receiving WebAuthn responses 162 from WebAuthn authenticators 160, WebAuthn proxies 150 may communicate WebAuthn responses 162 to browsers 140. Browsers 140 may then communicate WebAuthn responses 162 to authentication service 130 for authorization verification. In certain embodiments, authentication service 130 examines WebAuthn response 162, extracts the credential ID, performs a lookup of the registered credential public key in its database, and verifies the assertion signature. If the assertion signature is valid, authentication service 130 may look up the identity associated with the assertion's credential ID. If the credential ID is recognized by authentication service 130, the identity is authenticated. If the credential ID is not recognized by authentication service 130, then the authentication has failed. Authentication service 130 communicates the result (e.g., success or failure) to browser 140.

User 170 of system 100 is a person or group of persons who utilize one or more devices 120 of system 100. User 170 may be associated with one or more accounts (e.g., a WebAuth account). User 170 may be a local user, a remote user, an administrator, a customer, a company, a combination thereof, and the like. User 170 may be associated with a username, a password, a user profile, etc.

In operation, authentication service 130 of system 100 generates login prompt information 132 and communicates login prompt information 132 to local browser 140*a* installed on local device 120*a*. Local browser 140*a* detects that WebAuthn is not available and communicates login prompt information 132 (e.g., a challenge and an RPID) to local WebAuthn proxy 150*a* installed on local device 120*a*. WebAuthn proxy 150*a* formats WebAuthn credential request 152 using login prompt information 132 and communicates WebAuthn credential request 152 to WebAuthn authenticator 160. Upon receiving WebAuthn credential request, WebAuthn authenticator 160 processes WebAuthn credential request 152 by interacting with user 170. WebAuthn authenticator 160 then generates WebAuthn response 162 and communicates WebAuthn response 162 to local WebAuthn proxy 150*a*. WebAuthn proxy 150*a* communicates WebAuthn response 162 to local browser 140*a*, and local browser 140*a* communicates WebAuthn response 162 to authentication service 130 for authentication verification.

Authentication service 130 finalizes the authentication by verifying WebAuthn response 162 and sends the authentication status (e.g., success or failure) to local browser 140*a*. As such, system 100 uses WebAuthn proxy 150*a* to communicate with WebAuthn authenticator 160 on behalf of local browser 140*a* that does not support WebAuthn, which overcomes the limitations of the WebAuthn protocol while preserving the core security properties of the protocol.

Although FIG. 1 illustrates a particular number of networks 110, devices 120, authentication services 130, browsers 140, WebAuthn proxies 150, WebAuthn authenticators 160, and users 170, this disclosure contemplates any suitable number of networks 110, devices 120, authentication services 130, browsers 140, WebAuthn proxies 150, WebAuthn authenticators 160, and users 170. For example, system 100 may include more than one authentication service 130.

Although FIG. 1 illustrates a particular arrangement of network 110, devices 120, authentication service 130, browsers 140, WebAuthn proxies 150, WebAuthn authenticators 160, and user 170, this disclosure contemplates any suitable arrangement of network 110, devices 120, authentication service 130, browsers 140, WebAuthn proxies 150, WebAuthn authenticators 160, and user 170. Furthermore, although FIG. 1 describes and illustrates particular components, devices, or systems carrying out particular actions, this disclosure contemplates any suitable combination of any suitable components, devices, or systems carrying out any suitable actions.

Figure 2:
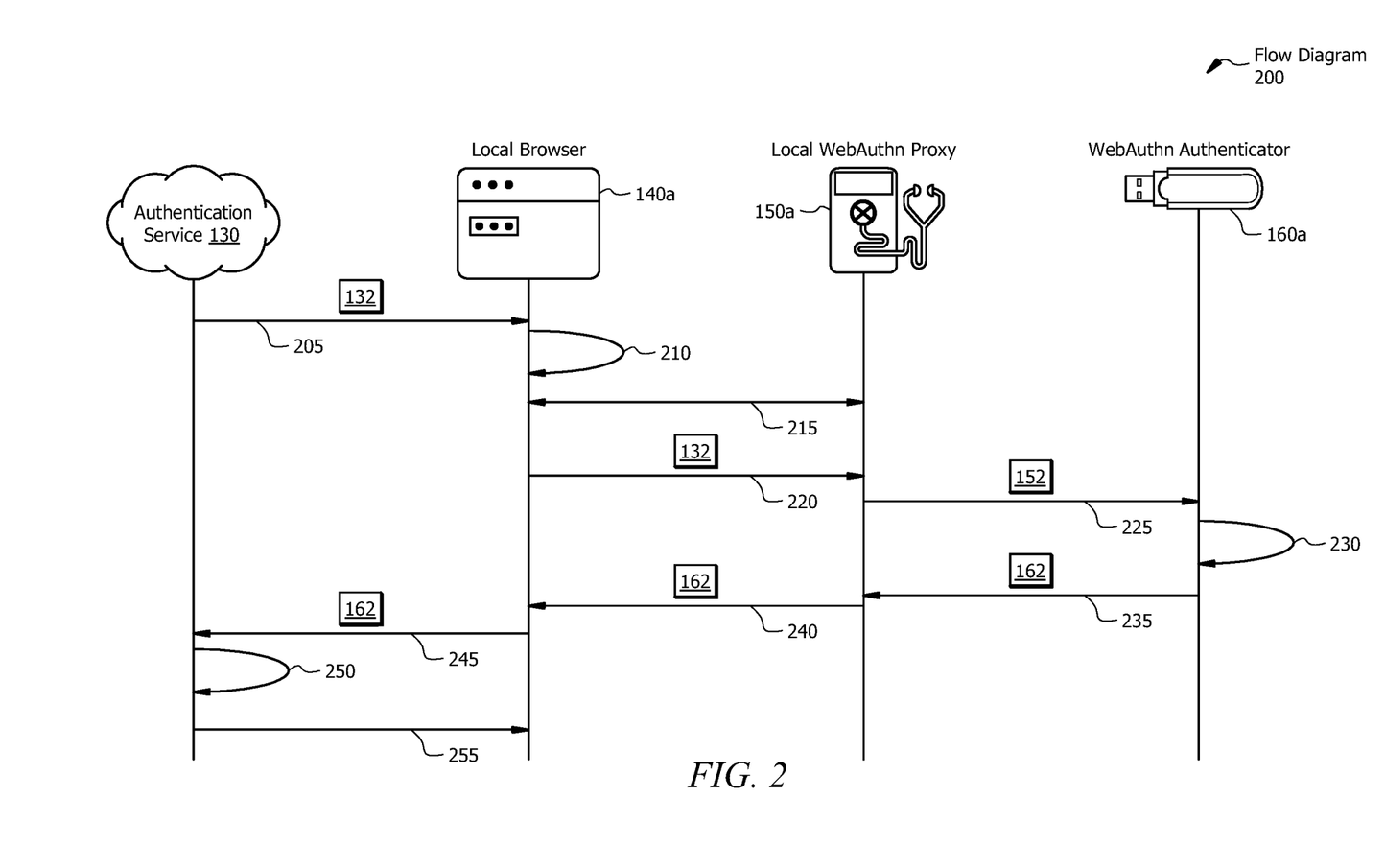
FIG. 2 illustrates an example flow diagram for WebAuthn transport via a WebAuthn proxy installed on a local device.

FIG. 2 illustrates an example flow diagram 200 for WebAuthn transport via a WebAuthn proxy installed on a local device (e.g., local device 120*a* of FIG. 1). Flow diagram 200 may be used by system 100 of FIG. 1 in cases where the browser receiving the login prompt information does not support WebAuthn. The illustrated embodiment of FIG. 2 includes authentication service 130, local browser 140*a*, local WebAuthn proxy 150*a*, and WebAuthn authenticator 160*a*.

At step 205 of flow diagram 200, authentication service 130 communicates login prompt information 132 (e.g., a challenge and an RPID) to local browser 140*a*. In cases where local browser 140*a* supports WebAuthn, login prompt information 132 may use the WebAuthn API in local browser 140*a* to communicate with WebAuthn authenticator 160*a*. However, at step 210 of flow diagram 200, local browser 140*a* detects that the WebAuthn API is unavailable. Local browser 140*a* may be an embedded browser, a legacy browser, or any other browser that does not support WebAuthn.

At step 215 of flow diagram 200, local browser 140*a* establishes a connection with local WebAuthn proxy 150*a*. For example, local browser 140*a* may connect to a device health application (DHA) listen server and send a request to WebAuthn proxy 150*a* (e.g., the DHA) to ensure that WebAuthn proxy 150*a* is available. WebAuthn proxy 150*a* sends back a response acknowledging that it received the request from local browser 140*a*. At step 220 of flow diagram 200, local browser 140*a* communicates login prompt information 132 to local WebAuthn proxy 150*a* installed on the user's local device.

Login prompt information 132 includes all of the information normally included in a WebAuthn credential request (e.g., an RPID, a challenge, etc.). In certain embodiments, login prompt information 132 communicated from local browser 140*a* to local WebAuthn proxy 150*a* includes more information than login prompt information 132 received from authentication service 130, such as a TXID. In some embodiments, login prompt information 132 may be communicated to local WebAuthn proxy 150a via an established Hypertext Transfer Protocol Secure (HTTPS) connection.

Upon receiving login prompt information 132 from local browser 140a, local WebAuthn proxy 150a generates WebAuthn credential request 152 using login prompt information 132. For example, local WebAuthn proxy 150a may format WebAuthn credential request 152 using login prompt information 132. WebAuthn credential request 152 may include the RPID, the challenge, a client data hash, etc. At step 225 of flow diagram 200, local WebAuthn proxy 150a requests WebAuthn response 162 on behalf of local browser 140a by communicating WebAuthn credential request 152 to WebAuthn authenticator 160a. Because local WebAuthn proxy 150a is running outside of the context of local browser 140a, local WebAuthn proxy 150a is free to communicate with any WebAuthn authenticator 160 that is on the system.

At step 230 of flow diagram 200, a user (e.g., user 170 of FIG. 1) interacts with WebAuthn authenticator 160a to approve WebAuthn credential request 152. For example, WebAuthn authenticator 160a may locate a credential that matches the RPID and prompt the user to consent to the authentication (e.g., via an authorization gesture such as a biometric or personal identification number (PIN)). If the user consents to the authentication, WebAuthn authenticator 160a may create a new assertion by signing over the client data hash and authenticator data with the private key generated for the user's account during registration. WebAuthn authenticator 160a generates WebAuthn response 162, which may include authenticator data, client data JSON, an assertion signature, and the like.

At step 235 of flow diagram 200, WebAuthn authenticator 160a communicates WebAuthn response 162 to local WebAuthn proxy 150a. Local WebAuthn proxy 150a then communicates WebAuthn response 162 to local browser 140a over the HTTPS connection at step 240 of flow diagram 200. When the login prompt in local browser 140a receives WebAuthn response 162, local browser 140a communicates WebAuthn response 162 to authentication service 130 at step 245 of flow diagram 200. Authentication service 130 finalizes the authentication by verifying WebAuthn response 162 at step 250 of flow diagram 200. Authentication service 130 returns the authentication verification result (e.g., success or failure) to the prompt of local browser 140a at step 255 of flow diagram 200. The result indicates whether the user is allowed to login.

Because authentication service 130 is receiving WebAuthn response 162 in the same WebAuthn format that authentication service 130 is expecting from a normal browser that supports WebAuthn, authentication service 130 can verify WebAuthn response 162 the same way authentication service 130 verifies a credential from a normal browser. This allows the user to use the same WebAuthn authenticator 160a to log into a normal browser and an embedded browser without authentication service 130 having to track a separate credential.

Although FIG. 2 illustrates a particular number of authentication services 130, browsers 140, WebAuthn proxies 150, and WebAuthn authenticators 160, this disclosure contemplates any suitable number of authentication services 130, browsers 140, WebAuthn proxies 150, and WebAuthn authenticators 160. Although FIG. 2 illustrates a particular arrangement of authentication service 130, local browser 140a, local WebAuthn proxy 150a, and WebAuthn authenticator 160a, this disclosure contemplates any suitable arrangement of authentication service 130, local browser 140a, local WebAuthn proxy 150a, and WebAuthn authenticator 160a. Furthermore, although FIG. 2 describes and illustrates particular components, devices, or systems carrying out particular actions, this disclosure contemplates any suitable combination of any suitable components, devices, or systems carrying out any suitable actions.

Although this disclosure describes and illustrates particular steps of flow diagram 200 of FIG. 2 as occurring in a particular order, this disclosure contemplates any suitable steps of flow diagram 200 of FIG. 2 occurring in any suitable order. Although this disclosure describes and illustrates an example flow diagram for WebAuthn transport via a WebAuthn proxy including the particular steps of the method of FIG. 2, this disclosure contemplates any suitable flow diagram for WebAuthn transport via a WebAuthn proxy including any suitable steps, which may include all, some, or none of the steps of the method of FIG. 2, where appropriate.

Figure 3:
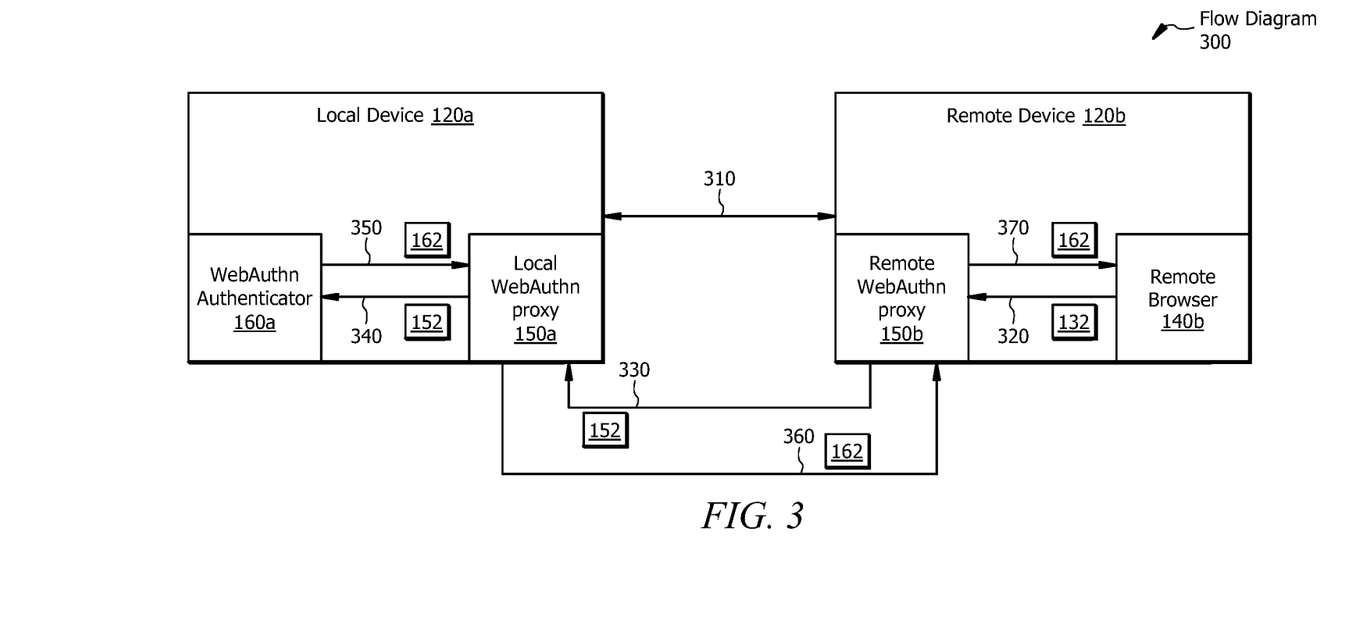
FIG. 3 illustrates an example flow diagram for WebAuthn transport via a WebAuthn proxy installed on a remote device.

FIG. 3 illustrates an example flow diagram 300 for WebAuthn transport via a WebAuthn proxy installed on a remote device. Flow diagram 300 may be used by system 100 of FIG. 1 in cases where the WebAuthn authenticator is installed on a local device but the browser is installed on a remote device. FIG. 3 includes local device 120a, remote device 120b, remote browser 140b, local WebAuthn proxy 150a, remote WebAuthn proxy 150b, and WebAuthn authenticator 160a. In the illustrated embodiment of FIG. 3, local WebAuthn proxy 150a and WebAuthn authenticator 160a are associated with local device 120a, and remote browser 140b and remote WebAuthn proxy 150b are associated with remote device 120b. Local WebAuthn proxy 150a is an application (e.g., a DHA) installed on local device 120a, and remote WebAuthn proxy 150b is an application (e.g., a DHA) installed on remote device 120b. Remote browser 140b is installed on remote device 120b.

At step 310 of flow diagram 300, a connection is established between local device 120a and remote device 120b. The connection type may be associated with a Remote Desktop Protocol (RDP), Virtual network Computing (VNC), a VPN, Secure Shell (SSH), SSH File Transfer Protocol (SFTP), web-based interfaces, or any other suitable network connection. For example, the connection may be an RDP connection that provides a user of remote device 120b with a graphical interface that allows the user to connect to local device 120a over the RDP connection.

A user of remote device 120b attempts to log into an application on remote device 120b via remote browser 140b installed on remote device 120b. Remote browser 140b detects that a WebAuthn authenticator is unavailable on remote device 120b. At step 320 of flow diagram 300, remote browser 140b reaches out to remote WebAuthn proxy 150b installed on remote device 120b. The communication between remote browser 140b and remote WebAuthn proxy 150b may be established using the same procedure described in step 215 of FIG. 2. Once communication is established between remote browser 140b and remote WebAuthn proxy 150b, remote browser 140b communicates login prompt information 132 to remote WebAuthn proxy 150b. Remote WebAuthn proxy 150b may or may not support WebAuthn. Remote WebAuthn proxy 150b formats login prompt information 132 into WebAuthn credential request 152.

At step 330 of flow diagram 300, remote WebAuthn proxy 150b forwards WebAuthn credential request 152 to local WebAuthn proxy 150a on local device 120a. Local WebAuthn proxy 150a communicates WebAuthn credential request 152 to WebAuthn authenticator 160a at step 340 of flow diagram 300. WebAuthn authenticator 160a generates WebAuthn response 162 and communicates WebAuthn response 162 to local WebAuthn proxy 150a at step 350 of flow diagram 300. At step 360 of flow diagram 300, local WebAuthn proxy 150a communicates WebAuthn response 162 to remote WebAuthn proxy 150b, which in-turn communicates WebAuthn response 162 to remote browser 140b. As such, flow diagram 300 of FIG. 3 allows users with a valid WebAuthn authenticator installed on a local device to log into applications on a remote device by proxying the request to the local device.

In certain embodiments, an encrypted, authenticated connection is established between local WebAuthn proxy 150a and remote WebAuthn proxy 150b to preserve the channel binding properties of WebAuthn. The connection is authenticated to prove that remote WebAuthn proxy 150b requesting WebAuthn response 162 is the same device the user is logged into remotely. In certain embodiments, the connection is authenticated by sharing a pairing code over the connection established at step 310. For example, WebAuthn proxy 150a may include a pairing code over an RDP data channel that is opened when the user logs into remote device 120b. Remote WebAuthn proxy 150b then reads that pairing code out of the RDP data channel to determine where to send future WebAuthn transactions. This approach may be used when the remote login supports the transfer of data over the remote connection in this way (e.g., for a desktop RDP client).

In some embodiments, the connection between local WebAuthn proxy 150a and remote WebAuthn proxy 150b is authenticated by the user logging into remote device 120b and manually entering a code provided by local WebAuthn proxy 150a. When the user starts a WebAuthn transaction on remote device 120b, WebAuthn proxy 150b prompts the user to enter a one-time use pairing code provided by local WebAuthn proxy 150a. This embodiment may facilitate pairing when the remote connection does not support the transfer of data over the remote connection (e.g., for a web-based RDP client).

Although FIG. 3 illustrates a particular number of devices 120, authentication services 130, browsers 140, WebAuthn proxies 150, and WebAuthn authenticators 160, this disclosure contemplates any suitable number of devices 120, authentication services 130, browsers 140, WebAuthn proxies 150, and WebAuthn authenticators 160. Although FIG. 3 illustrates a particular arrangement of local device 120a, remote device 120b, authentication service 130, remote browser 140b, local WebAuthn proxy 150a, remote WebAuthn proxy 150b, and WebAuthn authenticator 160, this disclosure contemplates any suitable arrangement of local device 120a, remote device 120b, authentication service 130, remote browser 140b, local WebAuthn proxy 150a, remote WebAuthn proxy 150b, and WebAuthn authenticator 160.

Although FIG. 3 describes and illustrates particular components, devices, or systems carrying out particular actions, this disclosure contemplates any suitable combination of any suitable components, devices, or systems carrying out any suitable actions. For example, device 120a and device 120b may both be local devices. As another example, device 120a and device 120b may both be remote devices.

Although this disclosure describes and illustrates particular steps of flow diagram 300 of FIG. 3 as occurring in a particular order, this disclosure contemplates any suitable steps of the flow diagram 300 of FIG. 3 occurring in any suitable order. Although this disclosure describes and illustrates an example flow diagram for WebAuthn transport via a WebAuthn proxy including the particular steps of the method of FIG. 3, this disclosure contemplates any suitable flow diagram for WebAuthn transport via a WebAuthn proxy including any suitable steps, which may include all, some, or none of the steps of the method of FIG. 3, where appropriate. For example, Webauthn authenticator 160 may communicate WebAuthn response 162 directly to remote WebAuthn proxy 150b rather than communicating WebAuthn response 162 through local WebAuthn proxy 150a. As another example, flow diagram 300 may incorporate one or more steps of flow diagram 200 described in FIG. 2 above.

Figure 4:
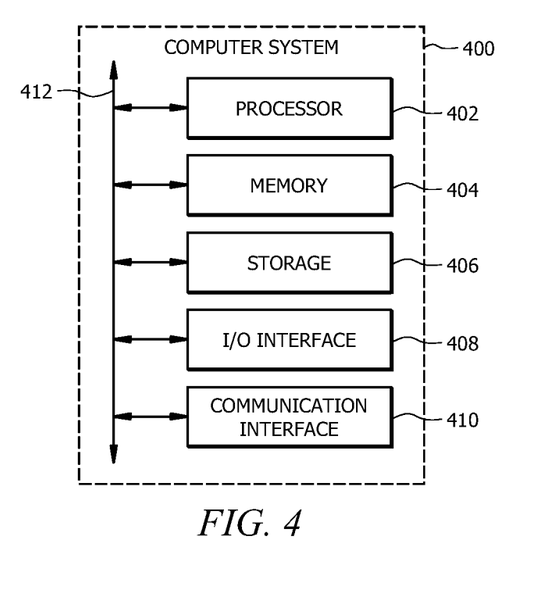
FIG. 4 illustrates an example computer system that may be used by the systems and methods described herein.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a USB drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A device, comprising:
one or more processors; and
one or more computer-readable non-transitory storage media coupled to the one or more processors and comprising instructions that, when executed by the one or more processors, cause the device to perform operations comprising:
receiving, by a WebAuthn proxy, login prompt information from a browser, wherein the WebAuthn proxy and the browser are installed on the device;
generating, by the WebAuthn proxy, a WebAuthn credential request based on the login prompt information;
communicating, by the WebAuthn proxy, the WebAuthn credential request to a WebAuthn authenticator;
receiving, by the WebAuthn proxy, a WebAuthn response from the WebAuthn authenticator; and
communicating, by the WebAuthn proxy, the WebAuthn response to the browser;
wherein the device is a local device, wherein the WebAuthn authenticator is installed on the local device, and wherein the browser is an embedded browser in a local application installed on the local device.

2. The device of claim 1, wherein:
the device is a remote device;
the WebAuthn authenticator is installed on a local device;
the WebAuthn proxy is a remote WebAuthn proxy installed on the remote device that communicates the WebAuthn credential request to the WebAuthn authenticator via a local WebAuthn proxy installed on the local device; and
the remote WebAuthn proxy receives the WebAuthn response from the WebAuthn authenticator via the local WebAuthn proxy.

3. The device of claim 1, wherein:
the login prompt information comprises a challenge and a Relying Party (RP) identifier (RPID); and
the WebAuthn response comprises an authenticator assertion.

4. The device of claim 1, wherein the WebAuthn authenticator is associated with one of the following:
a security key; or
a platform authenticator.

5. The device of claim 1, wherein the browser does not support WebAuthn.

6. The device of claim 1, wherein the WebAuthn proxy is associated with a device health application.

7. A method, comprising:
receiving, by a WebAuthn proxy, login prompt information from a browser, wherein the WebAuthn proxy and the browser are installed on a device;
generating, by the WebAuthn proxy, a WebAuthn credential request based on the login prompt information;
communicating, by the WebAuthn proxy, the WebAuthn credential request to a WebAuthn authenticator;

receiving, by the WebAuthn proxy, a WebAuthn response from the WebAuthn authenticator; and communicating, by the WebAuthn proxy, the WebAuthn response to the browser;

wherein the device is a local device, wherein the WebAuthn authenticator is installed on the local device, and wherein the browser is an embedded browser in a local application installed on the local device.

8. The method of claim 7, wherein:

the device is a remote device;

the WebAuthn authenticator is installed on a local device;

the WebAuthn proxy is a remote WebAuthn proxy installed on the remote device that communicates the WebAuthn credential request to the WebAuthn authenticator via a local WebAuthn proxy installed on the local device; and the remote WebAuthn proxy receives the WebAuthn response from the WebAuthn authenticator via the local WebAuthn proxy.

9. The method of claim 7, wherein:

the login prompt information comprises a challenge and a Relying Party (RP) identifier (RPID); and the WebAuthn response comprises an authenticator assertion.

10. The method of claim 7, wherein the WebAuthn authenticator is associated with one of the following:

a security key; or a platform authenticator.

11. The method of claim 7, wherein the browser does not support WebAuthn.

12. The method of claim 7, wherein the WebAuthn proxy is associated with a device health application.

13. One or more computer-readable non-transitory storage media embodying instructions that, when executed by a processor, cause the processor to perform operations comprising:

receiving, by a WebAuthn proxy, login prompt information from a browser, wherein the WebAuthn proxy and the browser are installed on a device;

generating, by the WebAuthn proxy, a WebAuthn credential request based on the login prompt information;

communicating, by the WebAuthn proxy, the WebAuthn credential request to a WebAuthn authenticator;

receiving, by the WebAuthn proxy, a WebAuthn response from the WebAuthn authenticator; and communicating, by the WebAuthn proxy, the WebAuthn response to the browser;

wherein the device is a local device, wherein the WebAuthn authenticator is installed on the local device, and wherein the browser is an embedded browser in a local application installed on the local device.

14. The one or more computer-readable non-transitory storage media of claim 13, wherein:

the device is a remote device;

the WebAuthn authenticator is installed on a local device;

the WebAuthn proxy is a remote WebAuthn proxy installed on the remote device that communicates the WebAuthn credential request to the WebAuthn authenticator via a local WebAuthn proxy installed on the local device; and the remote WebAuthn proxy receives the WebAuthn response from the WebAuthn authenticator via the local WebAuthn proxy.

15. The one or more computer-readable non-transitory storage media of claim 13, wherein:

the login prompt information comprises a challenge and a Relying Party (RP) identifier (RPID); and the WebAuthn response comprises an authenticator assertion.

16. The one or more computer-readable non-transitory storage media of claim 13, wherein the WebAuthn authenticator is associated with one of the following:

a security key; or a platform authenticator.

17. The one or more computer-readable non-transitory storage media of claim 13, wherein the browser does not support WebAuthn.

* * * * *